UNITED STATES PATENT OFFICE.

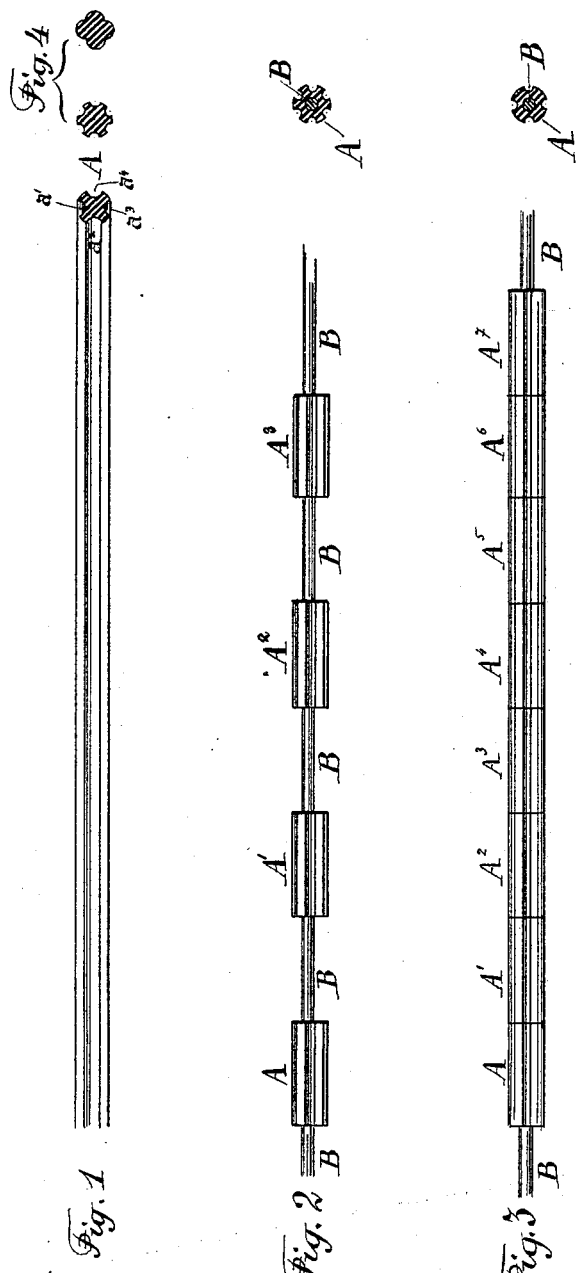

FRANÇOIS TURRETTINI, OF GENEVA, SWITZERLAND.

ENDLESS SAW FOR CUTTING STONE.

SPECIFICATION forming part of Letters Patent No. 379,835, dated March 20, 1888.

Application filed July 1, 1887. Serial No. 243,081. (No model.) Patented in Belgium July 15, 1887, No. 77,959; in France October 29, 1887, No. 183,836, and in Italy December 31, 1887, No. 22,576/383.

*To all whom it may concern:*

Be it known that I, FRANÇOIS TURRETTINI, of Geneva, in Switzerland, have invented a new and useful Improvement in Endless Saws for Cutting Stones, (for which I have obtained Letters Patent in Belgium, No. 77,959, July 15, 1887; in France, No. 183,836, October 29, 1887, and in Italy, No. 22,576, (383, b. d.,) December 31, 1887,) of which the following is a specification.

My invention consists of a new system of endless saws intended for cutting stones of all kinds, and combined so as to avoid the different inconveniences inherent to the already used stone-cutting endless saws formed of helicoidal steel wires running over two or more driving-pulleys.

My system of endless saws consists of a wire of steel or iron provided with grooves of various forms running parallel to the axis of the wire. I form an endless ring of such a wire, and I have the same running upon two or more grooved pulleys which are driven by means of special machines having the necessary dispositions for causing the wire to rotate about its own axis, and for injecting into the grooves of the wire the necessary water and on those places where it is employed to cut the stone.

In the accompanying drawings, Figures 1, 2, and 3 show various constructions of wires intended to form endless saws of my system. Fig. 4 shows two different sections of such wires.

In all the figures similar letters refer to similar pieces.

As shown in Fig. 1, the wire A is provided with grooves $a'$ $a^2$ $a^3$ $a^4$, running parallel to its axis. These grooves may vary in respect to their form as well as in respect to their number. Fig. 4 shows two examples of those variations.

In some cases I form the endless saw of a cylindrical wire, B, upon which I string a series of pieces, $A'$ $A^2$ $A^3$, &c., of grooved wire, formed as above described, and provided with an axial hole corresponding to the cylindrical wire B.

The endless saws of the before-described construction may have their elements $A'$ $A^2$ $A^3$, &c., affixed at uniform space from one another upon the wire B, as shown in Fig. 2, or the elements $A'$ $A^2$ $A^3$, &c., may be placed end to end upon said wire B, as shown in Fig. 3.

I claim as my invention.

1. An endless band-saw for cutting stones, formed of steel or iron wire having a number of peripheral grooves running parallel to the axis of the wire, substantially as and for the purposes set forth.

2. An endless band-saw for cutting stones, formed of tubular steel or iron wire having a number of peripheral grooves running parallel to the axis of the wire, and a wire core passing through the tubular sections and connecting them together, substantially as and for the purposes specified.

Signed by me this 10th day of June, A. D. 1887.

FRANÇOIS TURRETTINI. [L. S.]

Witnesses:
　THS. THIER,
　EDMER SCHNEIDER.